United States Patent [19]

Cooper et al.

[11] 3,914,745

[45] Oct. 21, 1975

[54] SYSTEM AND METHOD FOR ALIGNING TEXTUAL CHARACTER FIELDS

[75] Inventors: Donald Walter Cooper; James Bradley Unruh, both of Austin, Tex.

[73] Assignee: IBM Corporation, Armonk, N.Y.

[22] Filed: Dec. 26, 1973

[21] Appl. No.: 427,616

[52] U.S. Cl. .................................. 340/172.5; 197/19

[51] Int. Cl.² ........................ G06F 3/10; G06F 7/00

[58] Field of Search .................. 340/172.5; 95/4.5 J; 354/5–19; 197/19

[56] References Cited

UNITED STATES PATENTS

| | | | |
|---|---|---|---|
| 3,501,746 | 3/1970 | Vosbury | 340/172.5 |
| 3,553,445 | 1/1971 | Hernandez | 340/172.5 X |
| 3,577,127 | 5/1971 | Bishop et al. | 340/172.5 |
| 3,579,193 | 5/1971 | Bernier | 340/172.5 |
| 3,599,177 | 8/1971 | Jen et al. | 340/172.5 |
| 3,602,893 | 8/1971 | Hodges | 340/172.5 |
| 3,648,245 | 3/1972 | Dodds, Jr. et al. | 340/172.5 |
| 3,648,251 | 3/1972 | Serracchioli et al. | 340/172.5 |
| 3,688,299 | 8/1972 | Matsushita et al. | 340/172.5 X |
| 3,764,993 | 10/1973 | Lettieri | 340/172.5 |
| 3,812,945 | 5/1974 | Koplow et al. | 197/19 |

*Primary Examiner*—Gareth D. Shaw
*Assistant Examiner*—Paul R. Woods
*Attorney, Agent, or Firm*—Douglas H. Lefeve; James H. Barksdale, Jr.

[57] ABSTRACT

A system and method are disclosed for providing vertical decimal point alignment in columns of textual characters wherein each level of the column includes a group of textual characters including a decimal point. This alignment is automatically provided regardless of the number of characters to the left or right of the decimal point in each group. The system includes a keyboard connected to generate codes for input into a recirculating memory. Control circuitry responsive to the keyboard generation of a decimal tab control code causes subsequently entered text codes to be stored in the memory in a contiguous group. A backspace code is automatically stored in the memory as each of these text codes is stored. The backspace codes form a contiguous group that precedes the first of said subsequently entered text codes. A printer connected to the memory backspaces as each backspace code is entered into the memory. A keyboard generated decimal point code is input into the memory as a text code, but no further backspace codes are stored in the memory corresponding to the decimal point code or to text codes entered after the entry of the decimal point code. Upon keyboard generation of a field-end code (such as a carrier return or tab), the character codes, including the decimal point, are printed. A plurality of groups of characters, therefore, may be entered into the memory in this manner to allow vertical alignment of the decimal points.

3 Claims, 16 Drawing Figures

SYSTEM AND METHOD FOR ALIGNING TEXTUAL CHARACTER FIELDS

CROSS-REFERENCE TO RELATED APPLICATION

U.S. patent application Ser. No. 428,542, filed Dec. 26, 1973, having the same inventors as this invention and entitled, "Centering of Textual Character Fields about a Point".

BACKGROUND OF THE INVENTION

1. Field of the Invention

This invention relates to text processing in general and more particularly to a system and method for automatically arranging the sequence of textual character codes and control codes upon input of the codes into a recirculating memory to facilitate alignment of the printout of the stored textual characters.

2. Description of the Prior Art

A variety of solutions have been offered in the prior art to aid in the preparation of textual material in which it is desired to vertically align a column comprising various length groups of textual characters. A common example of this is a column of numbers in which, in the most difficult case, each number in the column contains a different number of digits to the left and right of a decimal point included therein. The term, "decimal tab", as used herein denotes the operation of aligning character groups in a column, each group including a single decimal point, such that all of the decimal points are vertically aligned.

U.S. Pat. No. 917,745 (1909), entitled "Type-Writing Machine", discloses a backspace key for a manual typewriter and a method for aligning columns of numbers by utilization of the backspace key. Assuming that it is desired to vertically align a column of numbers wherein each number is representative of an amount of dollars and cents, that patent discloses: (a) positioning the carriage to the units column, (b) operating the backspace key once for each digit to be typed, and (c) typing the digits. This operation is repeated on each level of the column to provide vertical alignment of the decimal points as well as alignment of the rightmost digit in each column (since the number of digits to the right of the decimal point is fixed at two). Obviously, this method requires the typist not only to count digits but also to count backspace cycles as the carriage or carrier is moved by the operator to the first digit position.

The publication "Text Formating" appearing in the IBM *Technical Disclosure Bulletin*, Vol. 16, No. 2, pages 391–394 (July 1973) discloses a "flush right" function as well as a decimal tab function for use in a power typing system including a character memory. By "flush right" is meant vertical alignment of the rightmost character in each group of a column of groups of charactes. The character memory disclosed by this reference contains a dedicated storage position for each print position along the typewriting line on the typing page. Entry into the flush right mode of operation causes escapement of the print carrier to the right margin while entry into the decimal tab mode of operation causes escapement of the print carrier to the next preset tab stop. The first character keyed while operating in either of these modes is entered into the memory storage position corresponding to the right margin or the tab stop, respectively. When the second character is keyed, the first character is shifted one storage location to the left and the second character is then entered into the memory location corresponding to the right margin or the tab stop, respectively. As the characters are keyed and entered the typewriter is conditioned for a non-print backspace operation and backspaces once for each character entered. In the flush right mode, playback of a number of lines entered in this manner results in a flush right margin although the left margin may be ragged. Keying of the decimal point in the decimal tab mode causes entry of the decimal point in the first storage position to the right of the tab stop and subsequently entered characters are entered to the right of the decimal point as they are typed. The printer remains in a non-print condition but, upon entry of the decimal point, is inhibited from further backspacing. After each of the digits to the right of the decimal point has been entered, a playback of the entire character group is effected.

Columnar entry of a plurality of numbers in this manner results in vertical alignment of the decimal point without requiring the operator to count the integral digits of the number of backspace or tab the printer in response to this count. Such a system, however, requires a dedicated memory storage position for each character positioned in a typed line or page. Thus, in many applications, such as when extremely wide margins are utilized, a large proportion of the available memory storage positions are not utilized. Therefore, the method of memory formatting or control taught by this publication could not be used in a power typing system utilizing a dynamic shift register memory for the character memory, wherein all storage positions may be utilized for text and cntrol code storage purposes regardless of character line lengths.

U.S. Pat. No. 3,739,344 (1973), entitled "Data Terminal Apparatus Having a Device for Aligning Printing Data", utilizes a recirculating memory for character and control code storage. A flush right character alignment apparatus is embodied therein by (a) dividing the memory into two storage zones, (b) sequentially entering characters into one of the storage zones while backspacing a connected printing device one space for each character entered, and (c) upon entry of the last character, transferring the stored characters to the other zone of the memory and to the printing device. As in the preceding reference, however, maximum memory storage utilization is not achieved because of the necessity of providing memory storage positions for the temporary zone. Where it is contemplated that exceedingly large numbers of characters may be aligned in this manner, a considerable number of storage positions remain unused for textual character storage when not operating in this mode.

It would, therefore, be advantageous to provide a very efficient system and method for arranging the sequence of storage of textual codes in a recirculating memory, whereby an operator may perform a decimal tab or flush right operation without counting characters or otherwise causing operator-performed movement of the print element or carriage before typing the text material.

SUMMARY OF THE INVENTION

Accordingly, the disclosed system and method provide vertical decimal point alignment in columns of textual characters wherein each level of the column includes a group of textual characters including a decimal point. This alignment is automatically provided regardless of the number of characters to the left or right of the decimal point in each group.

A textual character and control code generting means is electrically connected to a recirculating memory capable of storing *m* codes, each of the codes including *n* parallel bits. An n bit operation flag code recirculates along with the other codes to define an operating point within the memory. Control circuitry responsive to the generation of a decimal tab control code enables the input of a decimal tab flag code into the memory immediately preceding the operation flag code. Character codes that are subsequently generated are input into the memory immediately preceding the operation flag code, between the decimal tab flag code and the operation flag code. A backspace code corresponding to each character code is also input into the memory immediately succeeding the decimal tab flag code. The generation of a decimal point code causes input of the decimal point code into the memory as a character code, but the input of a backspace code corresponding thereto, or of further backspace codes, is inhibited. Characters generated subsequent to the input of the decimal point code are input into the memory as characters.

If a printer is connected to the memory the printer backspaces one space for each backspace code as the backspace codes are entered into the memory. The memory organization, therefore, assumes the following format: decimal tab flag code; *x* backspace codes; *x* character codes (characters to the left of the decimal point); decimal point code; *y* character codes (characters to the right of the decimal point); and operation flag code. After a field-end code (such as a carrier return or tab) has been generated and detected, the character codes, including the decimal point, are printed. The decimal tab flag code may be preceded by a tab code corresponding to the desired decimal point location on the printed record. A plurality of groups of characters may, therefore, be entered into the memory in this manner to allow vertical alignment of the decimal points.

Although the decimal tab flag code is replaced by a field-end code in the memory after the first printing of each group of characters, the backspace codes and character codes retained by the memory cause subsequent printings of the character codes stored in the memory to be identical to the first printing.

The disclosed control logic is also responsive to the generation of an error-correct code for deleting the character codes and backspace codes from the memory in the event of an error during the entry of said codes. The invention may also be utilized to perform a flush right operation rather than a decimal tab operation by entering the decimal tab mode of operation one space to the right of the desired right-most character position of the textual characters to be formatted in this manner.

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

It is assumed, for the purposes of illustration, that logic requiring positive inputs for a positive output is employed unless indicated otherwise. That is, the logic circuits such as AND and OR circuits, for example, are operated by positive signal levels at the input to produce a positive level signal at the output. Logical levels which are not positive will be termed negative.

The term "cable" as used herein denotes a plurality of parallel conducters for conveying one or more coded binary characters in parallel form. It will be understood by those skilled in the art that a cable input to an AND circuit will, in actuality, require an equal plurality of AND circuits, although only one such circuit is shown for illustration purposes herein. The term "line" as used herein denotes a single conducter for the transmission of a positive or negative level logical signal.

Figure 1:
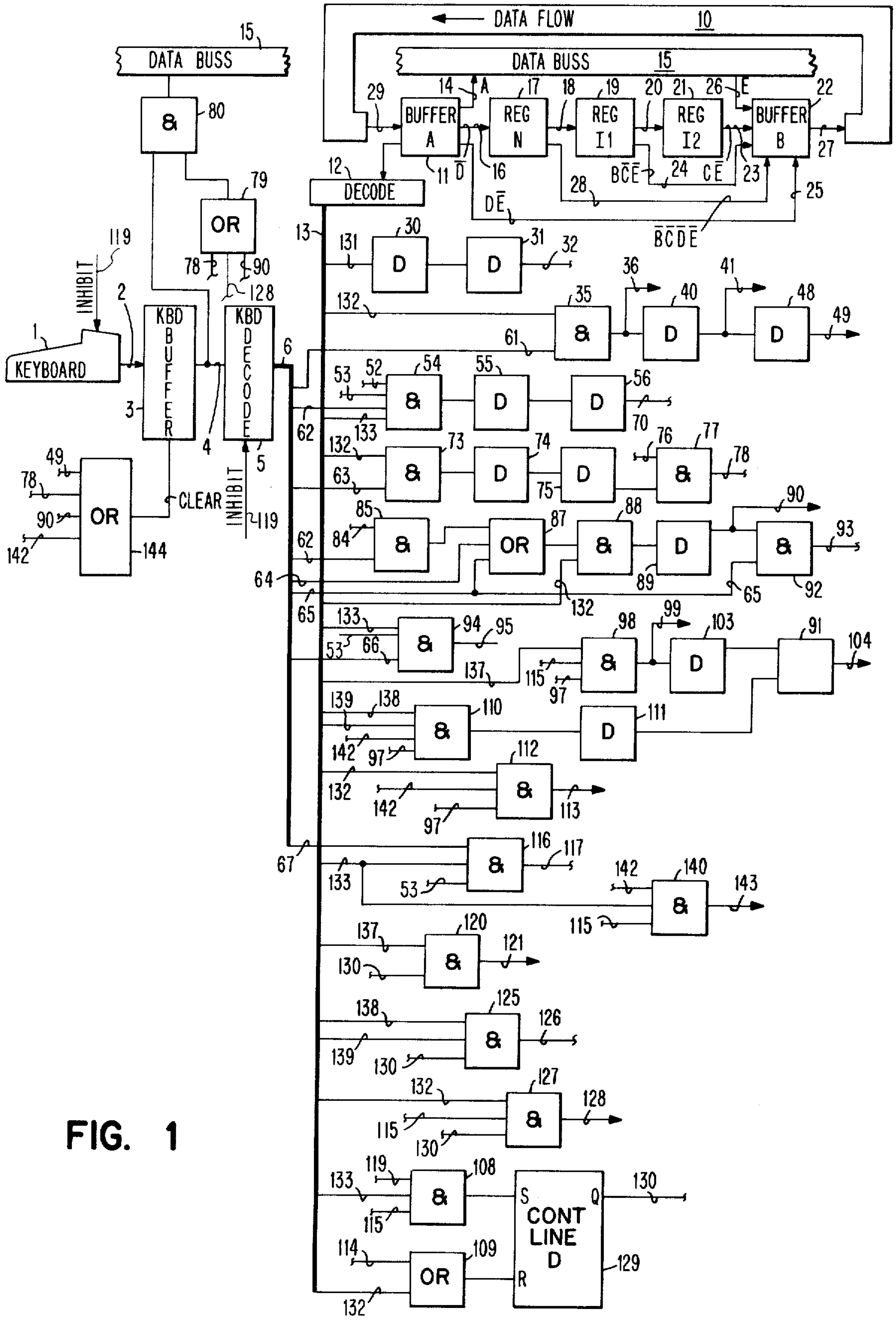
FIGS. 1 and 2 depict a preferred embodiment of the control logic for operation of a keyboard, recirculating buffer, and printer for textual character field alignment.
Figure 2:
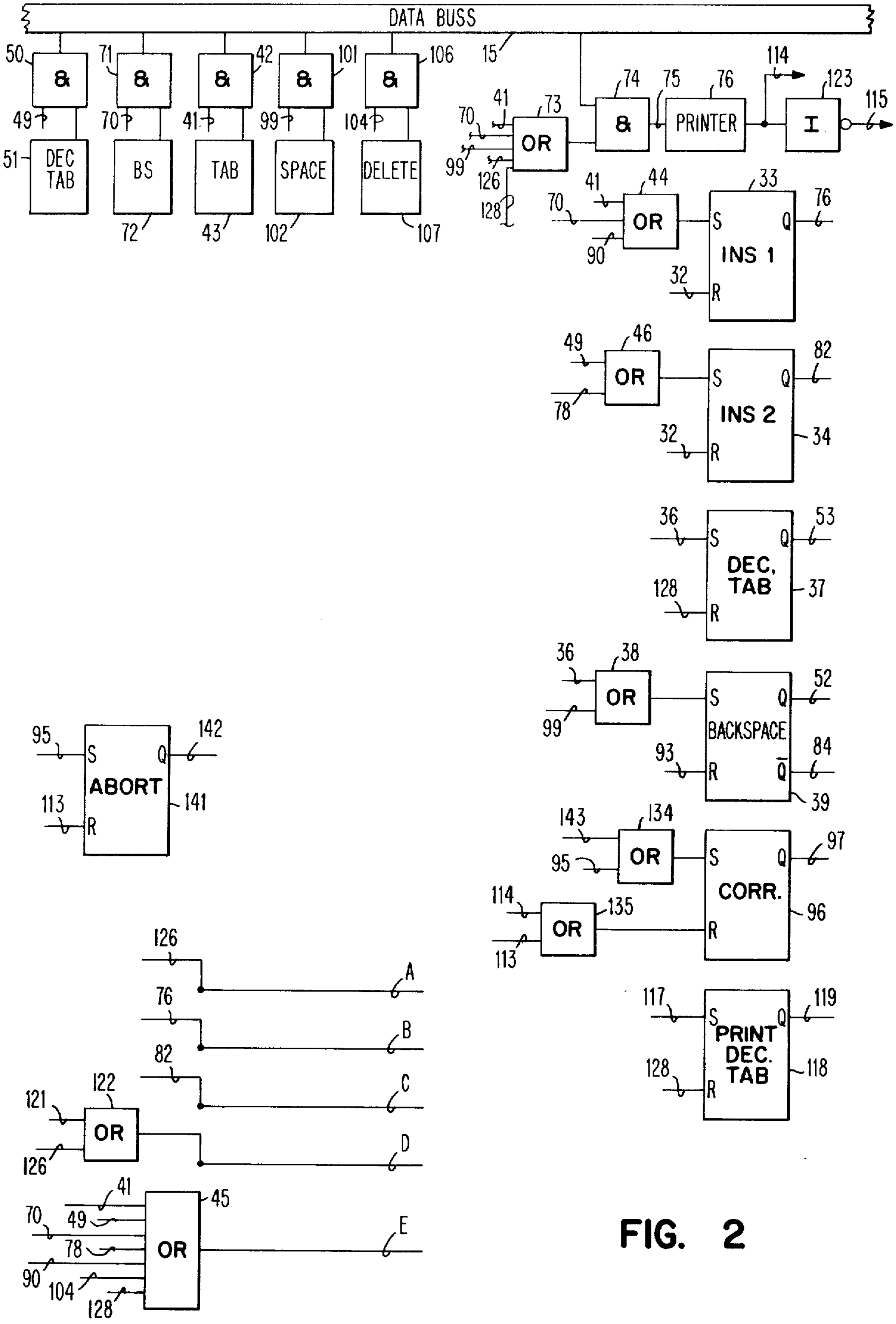

Referring now to FIGS. 1 and 2, an electrical keyboard 1 is provided for operator generation of parallel bit binary character codes and control codes. These codes are conveyed along a cable 2 to a keyboard buffer 3, the latter of which may be a one character register for temporary storage of the keyboard-generated codes for utilization by the remainder of the system. Buffer 3 includes a CLEAR input line which is responsive to a positive level to clear the buffer contents at the bit time following application of the positive level, it being assumed that the remainder of the system is unresponsive to the cleared buffer contents. The character and control codes generated by keyboard 1 are gated, at appropriate times as explained hereinafter, through AND circuit 80 to data buss 15. From data buss 15 the characters and control codes may be entered into a dynamic shift register memory 10 as explained hereinafter and/or may be gated through AND circuit 74 along cable 75 to printer 76, shown in FIG. 2.

Figure 7:
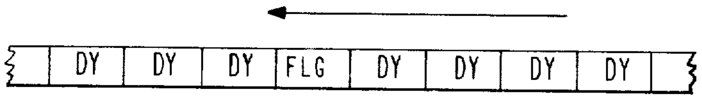
FIGS. 7–16 show pictorial representations of the storage sequence of data and control codes in the memory.
Figure 8:
Figure 9:
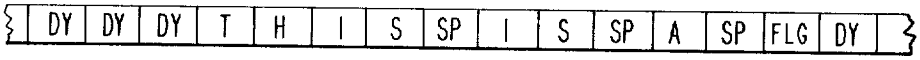

Memory 10 may be of the type described in U.S. Pat. No. 3,675,216 to Randell L. James, Ser. No. 104,888, filed Jan. 8, 1971, issued July 4, 1972, and entitled "No Clock Shift Register and Control Technique". As explained in detail therein, the dynamic shift register memory comprises m character storage positions of *n* bits in width. The data is continually recirculated throughout the memory in the form of a loop. An *n* bit operation flag code is initially written into one of the storage locations while *n* bit dummy codes are written into the remainder of the storage locations, as shown in FIG. 7. Each character or control code to be inserted into the memory is inserted into the memory location that precedes the operation flag and the remainder character or control codes and dummy codes are shifted to accommodate the insertion. Thus, in FIG. 8 the textual character T has been entered into the memory loop and in FIG. 9 the words and spaces, "THIS IS A ", have been entered. In a similar manner, the operation flag code may be used to define the point of output of characters and control codes from the memory. Thus, the operation flag defines the operation point within the memory without the necessity for clocking between an input/output device connected to the memory and without a complex addressing system to determine the appropriate memory locations for input or output operations.

Memory 10 includes a shift register control logic network (FIG. 3) to enable the alteration of data paths as the character, control, and flag codes are circulated through the memory to facilitate input, output, and deletion operations. For discussion purposes hereinafter, the terms "data codes" and "textual codes" will refer to textual character codes and printer control codes, both of which may be output from the memory to a printer, as distinguished from flag codes, which are introduced into the memory only by the control logic (not by the keyboard), and which are never output to a printer or other output device. The term "codes" is meant to include both data codes and flag codes. The term "system control code" refers to a keyboard-generated code that causes a particular logical operation of the system, but is not entered into the memory.

Figure 3:
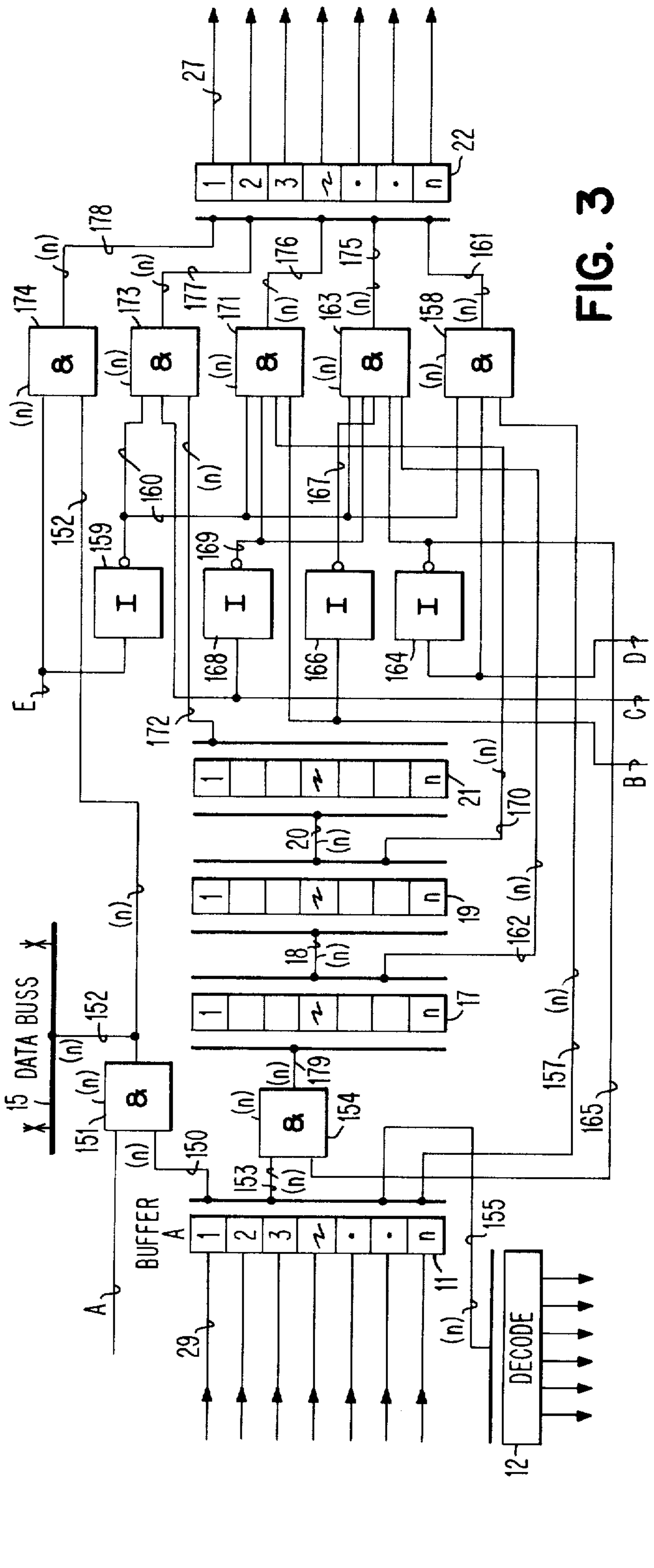
FIG. 3 depicts the logical interconnection of the shift register control portion of the dynamic shift register memory.

Referring to FIGS. 1 and 3, data is output from shift register 10 along cable 29 to input buffer 11, a single code register which will also be referred to hereinafter as buffer A. Decode 12 is connected to buffer A by cable 155 and may produce positive signals on one of its output lines depending upon the code then being stored in buffer A. It will be noted in FIG. 3 that all cables and multiple logical elements connected thereto (of which only one such logical element is shown in each intance) are also identified by the notation (*n*).

In FIG. 3 are shown five lines, A, B, C, D, and E, that are used to control the data paths for the input, output, and passage of data codes and flag codes through the memory. In FIG. 1, a shorthand notation of the data paths is shown in Boolean form to depict the paths along which the data and flag codes flow according to the positive and negative levels applied to lines A–E.

The application of a positive level on line A (in FIG. 3) enables AND circuit 151 to gate codes from buffer A along cable 150 to cable 152 and then on to data buss 15. This path is denoted by path 14 in FIG. 1.

As shown in FIG. 1, when a negative level is applied to line D, codes are transferred from buffer A along path 16 to register 17, a single code register referred to hereinafter as register N. In FIG. 3, the application of a negative level on line D is inverted to a positive level by INVERT 164 and is conveyed along line 165 to enable AND circuit 154 to convey the codes from buffer A along cable 153 to cable 179 and then into register n (17). As shown in both of FIGS. 1 and 3, codes shifted to register N may be also later shifted along cable 18 to insert register 19, a single code register hereinafter referred to as register I1. The codes may then be later shifted from register I1 along cable 20 to insert register 21, a single code register hereinafter referred to as register I2.

Codes may also be transferred from buffer A to output buffer 22, a single code register hereinafter referred to as buffer B, by providing positive and negative logical levels to lines D and E respectively. This path is denoted by the reference numeral 25 in FIG. 1. In FIG. 3, the code in buffer A is conveyed along cable 157 to an input of AND circuit 158. A positive logical level on line D enables a second input of this AND circuit while a negative level on line E is inverted by INVERT circuit 159, to a positive level on line 160 to enable the third input of AND circuit 158 which, thereby allows the gating of codes from cable 157 to cable 161 and into buffer B.

When negative logical levels are applied to lines B, C, D, and E, codes may be shifted out of register N into buffer B along the path denoted by reference numeral 28 in FIG. 1. In FIG. 3, the code in register N (17) is conveyed along cable 162 to one of five inputs of AND circuit 163. A negative logical level on line B is inverted by INVERT circuit 166 to a positive logical level on line 167 to enable a second input of AND circuit 163. A negative logical level on line C is inverted by INVERT circuit 168 to a positive logical level on line 169 to enable a third input of AND circuit 163. A negative logical level on line D is inverted by INVERT circuit 164 to a positive logical level on line 165 to enable a fourth input of AND circuit 163. Finally, a negative logical level on line E is inverted by INVERT circuit 159 to a positive level on line 160 to enable the fifth input of AND circuit 163 thereby gating codes from cable 162 to cable 175 and into buffer B (22).

A code in register I1 may be shifted into buffer B by application of a positive level to line B and negative levels to lines C and E. This path is denoted by reference numeral 24 in FIG. 1. In FIG. 3, the code in register I1 (19) is conveyed along cable 170 to one of four inputs of AND circuit 171. Application of a positive logical level to line B enables a second input of AND circuit 171. Application of a negative logical level to line C is inverted by INVERT circuit 168 to a positive logical level on line 169 to enable a third input of AND circuit 171. Application of a negative level on line E is inverted by INVERT circuit 159 to a positive logical level on line 160 to enable the fourth input of AND circuit 171, thereby allowing codes to be gated from cable 170 to cable 176 and into buffer B (22).

A code in register I2 may be shifted into buffer B by application of a positive level on line C and a negative level on line E. This path is denoted by the reference numeral 23 in FIG. 1. In FIG. 3, the code in register I2 (21) is conveyed along cable 172 to an input of AND circuit 173. A positive level on line C enables the second of the three inputs of AND circuit 173. A negative logical level on line E is inverted by INVERT circuit 159 to a positive level on line 160 enabling the third of the three inputs of AND circuit 173 thereby allowing codes to be gated from cable 172 to cable 177 and into buffer B (22).

Codes may be transferred from data buss 15 into output buffer B by application of a positive logical level on line E as denoted by reference numeral 26 in FIG. 1. One input of AND circuit 174 (FIG. 3) is connected to cable 152 which is connected to data buss 15. When a positive logical level appears on line E the other input of AND circuit 174 is enabled, thereby allowing codes to be gated from the data buss onto cable 178 and into buffer B (22).

Data shifted into buffer B through any path is conveyed along cable 27 and into memory 10.

Figure 4:
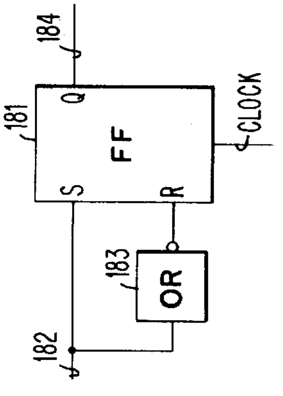
FIGS. 4 and 5 show a clocked flip-flop and timing diagram therefor, respectively, that may be used as the delay elements shown in FIG. 1.
Figure 5:
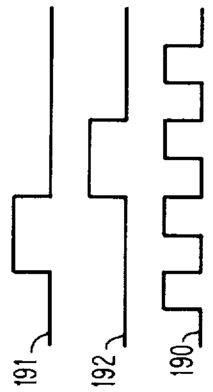

The DELAY circuits denoted in FIG. 1 by rectangular boxes including a D may take the form of the circuit shown in FIG. 4, a timing diagram of which is included in FIG. 5. FIG. 4 shows a conventional, clocked S-R flip-flop 181 having an input line 182 connected to the set input thereof. Any signal on line 182 is inverted by INVERT circuit 183 and applied to the reset input of flip-flop 181. The Q output is connected to line 184. A signal having a waveform such as that denoted by reference numeral 190 in FIG. 5 is applied to the CLOCK input of flip-flop 181. When a signal having a waveform denoted by reference numeral 191 is applied to line 182, the Q output of flip-flop 181 becomes positive at the next trailing or falling edge of the clocking waveform 190. If waveform 191 also becomes negative at this time, the Q output of flip-flop 181 will become negative at the next succeeding falling edge of waveform 190. Thus, flip-flop 181 can be utilized to provide a time delay of one clock cycle.

It will be understood by those skilled in the art that a CLOCK input is required for each of the DELAY circuits used in FIG. 1 if DELAY circuits such as those illustrated in FIG. 4 are utilized. It will also be understood by those skilled in the art that the other flip-flops to be hereinafter discussed as well as the storage cells of memory 10 and the five registers of the shift register control circuitry for memory 10 (buffers A and B and registers N, I1 and I2) may be clocked by waveform 190 or signals derived therefrom. For the purposes of description hereinafter, one clock period will be referred to as a "bit time".

Figure 6:
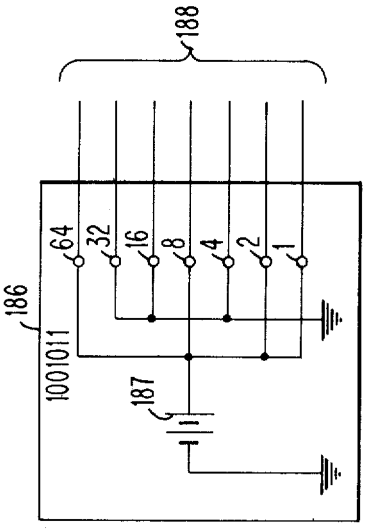
FIG. 6 shows an implementation of a generator for control codes introduced into the memory by operation of the logical elements of FIGS. 1 and 2.

In FIG. 2, code generators 43, 51, 72, 102 and 107 each produce a fixed n bit code for input into the memory and, in some instances, for simultaneous output to the printer. FIG. 6 shows a circuit that may be used, for example, to produce a 7 bit binary code. Code generator 186 includes a battery 187 or other suitable voltage source to energize certain order bit positions with a positive level. The other of the 7 bit positions are grounded. It will be understood by those skilled in the art that the circuit of FIG. 6 may be utilized for the above-mentioned code generators or that other code generation means known in the art may be utilized, for example a single character register loaded with the appropriate coded bit pattern.

In the following description of system structure and method of operation it must be assumed, at each bit time, that codes are shifted in the shift register control circuitry along the path determined by the logical levels on lines A through E immediately preceding the beginning of the bit time.

Referring again to FIGS. 1 and 2, a cable 4 connects the keyboard buffer 3 to a keyboard decode unit 5 which appropriately provides positive or logical level output signals along various output lines thereof of line bundle 6, dependent upon the data code then being stored in buffer 3. Line bundle 13 includes the output lines from the memory decode 12.

The detection of a dummy code in buffer A produces a positive level on line 131. At the beginning of the next succeeding bit time the output of delay circuit 30 becomes positive, thereby providing a positive input to DELAY circuit 31. Output line 32 of DELAY circuit 31 becomes positive at the beginning of the second succeeding bit time and the positive signal thereon is utilized to reset INS1 flip-flop 33 and INS2 flip-flop 34.

Assume now that an operator has depressed the particular key on keyboard 1 to cause the generation of a decimal tab code for entry into the decimal tab mode of operation to provide vertical alignment of decimal points in a column of groups of textual characters, each group containing a decimal point. The decoding of a decimal tab code by keyboard decode 5 produces a positive level on line 61 enabling one of the inputs of AND circuit 35. As the codes in memory 10 continue to circulate, a positive level is produced on output line 132 of memory decode 12 when the operation flag code is shifted into buffer A. This enables the other input of AND circuit 35, thereby producing a positive level on line 36 which, in turn, sets the DEC. tab flip-flop 37 and, through OR circuit 38, sets the BACKSPACE flip-flop 39, each of these flip-flops being set at the bit time following the shifting of the operation flag into buffer A. At this next bit time the operation flag is shifted into register N along path 16 and line 41 becomes positive during the delay introduced by DELAY circuit 40.

The positive level on line 41 enables AND circuit 42 to gate a tab code from tab code generator 43 onto data buss 15. The positive level on line 41 is also gated through OR circuit 73 to enable AND circuit 74 to gate the tab code on data buss 15 into the printer 76 along cable 75, thereby causing the printer to perform a tab operation. The positive level on line 41 is also gated through OR circuit 44 to set INS1 flip-flop 33. The positive level on line 41 is also gated through OR circuit 45 to provide a positive level on line E. Thus, a tab code is provided on data buss 15 and path 26 from data buss 15 to buffer B of memory 10 is enabled such that, at the end of the delay time provided by DELAY circuit 40, a data shift occurs in memory 10 and the tab code on data buss 15 is shifted into buffer B. At this time the operation flag code is shifted from register N into register I1, and flip-flop 33 becomes set because of the positive level applied to the set input thereof during the preceding bit time. Thus, the positive output of flip-flop 33 is conveyed along line 76 to provide a positive level to line B. A delay of one bit time provided by DELAY circuit 48 begins, thereby providing a positive level on line 49 which is gated through OR circuit 144 to clear buffer 3.

The positive level on line 49 also enables AND circuit 50 to gate a decimal tab flag code from decimal tab flag code generator 51 onto data buss 15. This positive level is also gated through OR circuit 46 to set INS2 flip-flop 34 which, at the next bit time, will apply a positive level on line C through line 82. The positive level on line 49 is also gated through OR circuit 45 to apply a positive level on line E. Organization in the memory control logic during this bit time is as follows: tab code in buffer B; decimal tab flag code on data buss ready to be shifted into buffer B at the next bit time; and operation flag code in register I1. At the next bit time the tab code is shifted out of buffer B into memory 10. The decimal tab flag code is shifted into buffer B from the data buss. The operation flag code being shifted out of register I1 cannot travel along path 24 because of the positive level on line E. Instead, the operation flag code is conveyed along cable 20 into register I2.

Figure 10:

At the next succeeding bit time, the tab code is shifted into the second memory location of memory 10, the decimal tab flag code is shifted out of buffer B into the first memory location of memory 10, and the operation flag code is conveyed along path 23 and into buffer B, path 23 being available by virtue of flip-flop 34 being set, thereby applying a positive level on line 82 to line C. At the following bit time, the tab code is shifted into the third memory location of memory 10, the decimal tab flag code is shifted into the second memory location of memory 10, and the operation flag code is shifted into the first memory location of memory 10. Thus, the organization of the codes in memory 10 is as shown in FIG. 10. After a delay of two bit times from the time that a dummy code is decoded by memory decode 12, flip-flops 33 and 34 become rest by virtue of a positive level on line 32, which, in turn, results in negative levels on lines B and C, respectively.

As shown in FIG. 10, and by virtue of the operation described above in organizing the memory codes to assume the sequence of tab code, decimal tab flag code, and operation flag code, the system is now ready to accept, organize, and store textual character codes input from the keyboard. The depression of a character key on keyboard 1 is decoded by decode 5, resulting in a positive level on line 62 which is applied to AND circuit 54. Lines 52 and 53 of AND circuit 54 are positive by virtue of flip-flops 39 and 37, respectively, having been set by the operation described above. When the decimal tab flag code is shifted into buffer A and decoded by decode 12, a positive level appears on line 133, thereby enabling the remaining input of AND circuit 54 to produce a positive level output.

The tab code, which precedes the decimal tab flag code, is in register N during the time that the decimal tab flag code is in buffer A. The tab code was previously shifted from buffer A into register N along path 16 because of the negative logical level appearing on line D.

At the next bit time the tab code is shifted from register N along path 28 into buffer B because negative logical levels are present on lines B, C, D, and E. The decimal tab flag code is shifted from buffer A into register N and the operation flag code is shifted from the last location of memory 10 into buffer A. the output of DELAY circuit 55 is positive during this bit time and line 70, the output of DELAY circuit 56, becomes positive during the next succeeding bit time.

At this next succeeding bit time the tab code is shifted out of buffer B into the first storage location of memory 10, the decimal tab flag code is shifted from register N into buffer B, and the operation flag code is shifted from buffer a into register N. A positive level on line 70 enables AND circuit 71 to gate a backspace code from backspace code generatpr 72 onto data buss 15. The positive level on line 70 is also gates through OR circuit 45 so that a positive level is now applied on line E to enable the backspace code to be shifted into buffer B at the following bit time. The positive level on line 70 is also gated through OR circuit 73 to enable AND circuit 74 to gate the backspace code on data buss 15 to printer 76, thereby causing the printer to backspace one space. Finally, the positive level on line 70 is also gated through OR circuit 44 to set INS1 flip-flop 33 at the next bit time.

From the time that a textual character code is struck on keyboard 1, line 63 of keyboard decode 5 has also been positive to indicate that a decimal tab control code is not in keyboard buffer 3. In the discussion immediately above, when the operation flag code was shifted from the last storage location of memory 10 into buffer A, memory decode 12 produced a positive level on line 132 to indicate the presence of the operation flag code in buffer A. The positive level on line 132 enabled the remaining input of AND circuit 73, thereby enabling AND circuit 73 to produce a positive output. At this point, the tab code was located in output buffer B and the decimal tab flag code was located in register N. At the next bit time thereafter, the decimal tab flag code was shifted into buffer B and the operation flag code was shifted into register N as described above regarding the positive level on line 70.

At the next succeeding bit time, the tab code is shifted from the first to the second memory location of memory 10, the decimal tab flag code is shifted from buffer B into the first memory location of memory 10, and the operation flag code is shifted from register N into register I1 along cable 18. The operation flag code was inhibited from traveling along path 28 because line E was positive by virtue of the positive level on line 70 being gated through OR circuit 45. At this bit time, the backspace code, gated to the data buss at the previous bit time, is shifted into buffer B. The organization of memory codes is now as follows: tab code in the second memory location, decimal tab flag code in the first memory location, backspace code in buffer B, operation flag code in register I1, and dummy codes in buffer A and in register N.

During this bit time the output of DELAY circuit 75 is positive enabling one of the inputs of AND circuit 77. The other input of AND circuit 77 became enabled at the beginning of this bit time by virtue of a positive output appearing at the INS1 flip-flop 33 and being conveyed along line 76 to the other input of AND circuit 77. The resultant positive output of AND circuit 77 is conveyed along line 78 and gated through OR circuit 79 to enable AND circuit 80 to gate the character being stored in keyboard buffer 3 onto data buss 15. The positive level n line 78 is also gated through OR circuit 46 to the set input of the INS2 flip-flop 34. The positive level on line 78 is also gated through OR circuit 45 to provide a positive level on line E. Further, the positive level on line 78 is gated through OR circuit 144 to clear keyboard buffer 3.

At the next bit time the tab code is shifted into the third memory location of memory 10, the decimal tab flag code is shifted into the second memory location, the backspace code is shifted from output buffer B into the first memory location of memory 10, and the character code is shifted from the data buss into output buffer B. Because line E was positive, path 24 was not available for shifting the operation flag code from register I1 into buffer B. Instead the operation flag code is shifted from register I1, along cable 20, and into register I2.

Figure 11:

On the next shift the operation flag code is moved from register I2 into buffer B by virtue of the positive level on line C produced by the set condition of flip-flop 34. On the shift following this, the operation flag code is shifted from buffer B into the first memory location. Memory organization is then as shown in FIG. 11, assuming that the character input at the keyboard was the digit 1. The INS1 and INS2 flip-flops 33 and 34, respectively, become reset at the end of two bit times after the decoding of a dummy code in buffer A, by virtue of a positive level on line 32.

Figure 12:
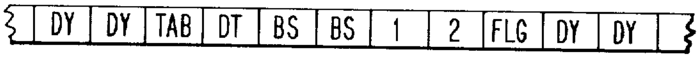

The cycle discussed above regarding the input of a backspace code following the decimal tab flag code and a character code preceding the operation flag code continues as characters are input from the keyboard. FIG. 12 depicts the memory organization assuming that the digit 2 is the second character code input from the keyboard. Additional characters input from the keyboard result in the insertion of a backspace code immediately following the decimal tab flag code and the insertion of the character code immediately preceding the operation flag code.

If a non-escaping code is struck at the keyboard, such as a control code to provide a one-half index of the printer platen for a subscript, a positive level is produced by decode 5 on line 64. If the decimal point is struck, a positive level is produced by decode 5 on line 65. In either event, a positive signal on line 64 or 65 is gated through OR circuit 87 to enable one of the inputs of AND circuit 88. When the operation flag code is shifted into buffer A and decoded, a positive level on line 132 provided by decode 12 enables the other input of AND circuit 88, thereby providing a positive input to DELAY circuit 89. At the next bit time the output of DELAY circuit 89 becomes positive and memory organization is generally as follows: a tab code, a decimal tab flag code, *x* backspace codes, *x* character codes (the last of said character codes being in buffer B), and the operation flag code is register N.

The positive level at the output of DELAY circuit 89 on line 90 is gated through OR circuit 79 to enable AND circuit 80 to gate the nonescaping character or decimal point onto data buss 15. The positive level on line 90 is also gated through OR circuit 144 to clear keyboard buffer 3. The positive level at the output of DELAY circuit 89 also enables one of the inputs of AND circuit 92. If the character is a decimal point code rather than a non-escaping code, the positive level on line 65 enables the other input of AND circuit 92 to provide a positive output at line 93 to reset BACKSPACE flip-flop 39 at the next bit time. This, in turn, will provide a negative logical level on line 52 to AND circuit 54 for inhibiting the entry of further backspace codes into the memory corresponding to character codes that are input by the keyboard subsequent to the input of the decimal point.

The positive level on line 90 is also gated through OR circuit 44 to set the INS1 flip-flop 33 at the next bit time. The positive level on line 90 is also gated through OR circuit 45 to provide a positive level to line E. This will allow the non-escaping control code or decimal point code presently on the data buss to be gated into buffer B at the next bit time. Because of the positive level on line E immediately before this next bit time, the operation flag code cannot be conveyed from register N to buffer B along path 28. Instead, the operation flag code is conveyed along cable 18 from register N to register I1. At the bit time following this, the decimal point or non-escaping code is shifted from buffer B into the first memory location of memory 10 and, because flip-flop 33 is now set and producing a positive level on line 76 and line B, the operation flag code is shifted along path 24 from register I1 into buffer B.

Figure 13:
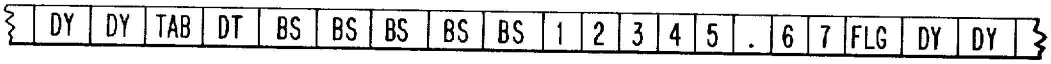

Assuming that the decimal point has been entered and that BACKSPACE flip-flop 39 has been reset, a positive level on output 84 thereof enables one of the inputs of AND circuit 85. The next character entered on keyboard 1 produces a positive level on line 62 enabling the other input of AND circuit 85, thereby providing a positive output which is gated through OR circuit 87 into a input of AND circuit 88. When the operation flag code is present in buffer A, a positive level on line 132 enables the other input of AND circuit 88. The character and keyboard buffer 3 is then entered into the memory immediately preceding the operation flag code in the same manner as described immediately above with respect to the entry of the decimal point code. As stated above, no further backspace codes are entered into the memory or sent to the printer. Assuming that the number 12345.67 has been entered from the keyboard in the decimal tab mode, organization of the data and flag codes in the shift register memory is as indicated in FIG. 13. Assume now that the operator realizes an error in one or more of the digits as a character group is being entered from the keyboard while in the decimal tab mode. The operator may depress an error-correct key which sends a particular code to keyboard buffer 3. Upon the decoding of the error-correct code a positive level appears on line 66 to enable one of the three inputs of AND circuit 94. The positive level output from flip-flop 37 enables a second input of AND circuit 94. When the decimal tab flag code is shifted into buffer A, decode 12 produces an output along line 133 enabling the third input of AND circuit 94, thereby providing a positive level on line 95.

The positive level on line 95 is applied to the SET input of ABORT flip-flop 141 and is gated through OR circuit 134 to the SET input of CORRECT flip-flop 96. The Q output of flip-flop 96 becomes positive at the next bit time providing a positive level on line 97 enabling one of the three inputs of AND circuit 98. Because the printer is not being operated during this period, a negative level is present on printer busy line 114 which is inverted by INVERT circuit 123 to provide a positive level on line 115, thereby enabling the second of the three inputs of AND circuit 98. At this next bit time a backspace code is present in buffer A which is decoded by decode 12 to produce a positive level on line 137 enabling the third input of AND circuit 98, thereby providing a positive level on line 99. The positive level on line 99 enables AND circuit 101 to gate a space code generated by space code generator 102 onto data buss 15. The positive level on line 99 is also gated through OR circuit 73 to enable AND circuit 74 to gate the space code on data buss 15 along cable 75 into printer 76, thereby causing the printer to space forward one space. The positive level on line 99 is also gated through OR circuit 38 to the set input of backspace flip-flop 39. The Q output of ABORT flip-flop 141 becomes positive at the beginning of this same bit time, thereby providing a positive level on line 142. This flip-flop will remain set throughout the error-correct operation. The positive level on line 142 is gated through OR circuit 144 to hold keyboard buffer 3 in a cleared condition throughout the error correct operation. This inhibits any attempted operator entry of codes until the error-correct operation has been completed.

At the following bit time DELAY circuit 103 produces a positive output which is gated through OR circuit 91 to provide a positive level on line 104. The positive level on line 104 provides an input to enable AND circuit 106 to gate a delete code generated by delete code generator 107 onto data buss 15. The positive signal on line 104 is also gated through OR circuit 45 to line E which enables the delete code to be shifted from the data bus into buffer B at the next bit time. In this manner the first backspace code following the decimal tab flag code is replaced by a delete code.

At the time that the space code was gated to printer 76, a positive level appeared on printer busy line 114, which was driven positive to indicate the unavailability of printer 76 to accept further codes. The positive level on line 114 was gated through OR circuit 135 to the RESET input of CORRECT flip-flop 96 which produced a negative level on the Q output and line 97 thereof during the time that the delete code was gated onto the data buss.

After the delete code is placed into the data stream, the memory contents are recirculated until the decimal tab flag is again detected in buffer A to produce a positive level on line 133, thereby enabling one of the three inputs of AND circuit 140. Assuming that the printer-busy line 114 is now negative, the negative level is inverted by INVERT circuit 123 to provide a positive level on line 115, thereby enabling another input of AND circuit 140. Since ABORT flip-flop 141 remains set throughout this operation, the positive level on line 142 enables the third input of AND circuit 140, thereby providing a positive level on line 143 which is then gated through OR circuit 134 to again set CORRECT flip-flop 96 at the next succeeding bit time.

During the time period of memory recirculation to set flip-flop 96 for the second time, it is assumed that printer 76 has had sufficient time to execute the spacing cycle and that the printer busy line 114 is now at a negative level which is inverted by INVERT circuit 123 to produce a positive level on line 115, thereby enabling an input of AND circuit 98. A positive level appears on line 97 to another input of AND circuit 98 because flip-flop 96 is again in a set condition. Therefore, a positive level appears on line 137 at the detection of the next backspace code in buffer A, causing the printer to again space forward one space and causing this backspace code in the memory to be replaced by a delete code. This process of spacing the printer and replacing backspace codes with delete codes, once per memory cycle, is repeated until all of the backspace codes have been replaced by delete codes in memory 10.

On the memory cycle following that during which the last backspace coe was replaced by a delete code, AND circuit 140 again produces a positive output on line 143 upon the decoding of the decimal tab flag code. This positive output on line 143 is gated through OR circuit 134 to enable CORRECT flip-flop 96 to become set at the next bit time. The resultant positive levels on line 97 (Q output of flip-flop 96) and line 142 (Q output of flip-flop 141) enable two of the four inputs of AND circuit 110. Decode 12 provides a positive level on line 138 in the absence of a backspace code in buffer A thereby enabling the third input of AND circuit 110. In the absence of the operation flag code in buffer A, a positive level is provided by decode 12 on line 139 which enables the fourth input of AND circuit 110, thereby providing a positive output level to DELAY circuit 111. The output of DELAY circuit 111 produces a positive level at the next bit time that is gated through OR circuit 91 to provide a positive level on line 104. The positive level on line 104 provides an input to enable AND circuit 106 to gate a delete code generated by delete code generator 107 onto data buss 15. The positive level on line 104 is also gated through OR circuit 45 to provide a positive level on line E thereby enabling a character code to be replaced by a delete code at the next succeeding bit time.

At the beginning of the bit time during which DELAY circuit 111 produces a positive output, another code is shifted into buffer A. The output of AND circuit 110 becomes positive again if this code is neither a backspace code nor the operation flag code and another character code is thereby deleted during the same memory cycle. It will, therefore, be understood that, although backspace codes could be replaced by delete codes only once per cycle because of the necessity to space the relatively slow moving printer for each backspace code deleted, any number of character codes may be replaced by delete codes in the same memory cycle since no printer operation is required.

As the character codes are shifted through buffer A and subsequently replaced by delete codes, the operation flag code is eventually shifted into buffer A causing a positive signal on line 132 enabling one of the inputs of AND circuit 122. Another of the three inputs of AND circuit 112 is enabled by a positive level on line 142 generated by ABORT flip-flop 141. The third input of AND circuit 112 is enabled by the positive output level from flip-flop 96 appearing on line 97. Thus, all of the inputs of AND circuit 112 are now enabled resulting in a positive output on line 113 which is gated through OR circuit 135 to reset CORRECT flip-flop 96 at the next bit time. The position level on line 113 is also connected to reset ABORT flip-flop 141 at the next bit time. At this time the memory organization is as follows: tab code, decimal tab flag code, a plurality of delete codes, operation flag code, and dummy codes.

A discussion of the removal of delete codes from the memory is discussed in the above-referenced U.S. Pat. No. 3,675,216. Therefore, no detailed discussion of this operation is included herein. However, it will be understood by those skilled in the art that the removal of a single delete code per memory revolution can be accomplished by applying a positive level to line D at one bit time following the decoding of a delete code in buffer A and sustaining this positive level on line D until the decoding of the first dummy code to be shifted into buffer A. At the time that this dummy code is shifted into buffer A, positive levels are applied to lines A and E for one bit time and a negative level is sustained on line D until the next delete code is detected on the next memory revolution. The repetition of this process, once per memory revolution, results in the eventual removal of all delete codes.

It is not necessary that the delete codes be removed from the memory before input of subsequent characters. At the termination of the above-described error-correct operation the system remains in the decimal tab mode. If characters are keyboarded before removal of the delete codes they may be entered into the memory as if there were no delete codes therein. Thus, backspace codes are always input immediately succeeding the decimal tab flag code and textual codes are always input immediately preceding the operation flag code. The delete codes may be removed during subsequent memory revolutions during which no other operations are being performed. If any delete codes remain in the memory at the time of output to the printer, the decode of the printer may be structured to be unresponsive to the delete codes.

Assume now that the operator has completed the keyboard entry of a group of characters and desires that the characters be printed. At this time the operator depresses any of a number of control keys, such as a tab key or a carrier return key, to produce a code defined hereinafter as a field-end code. Upon the decoding of a field-end code by keyboard decode 5, a positive level appears on line 67 enabling one of the three inputs of AND circuit 116. Because the DEC. TAB latch 37 has never been reset during this mode of operation, a positive level appears on line 53 enabling another input of AND circuit 116. Decode 12 produces a positive level on line 133 when the decimal tab flag code is shifted into buffer A, thereby enabling the third input of AND circuit 116, which provides a positive level on output line 117 thereof. The positive level on line 117 is applied to the SET input of PRINT DEC. TAB flip-flop 118 which produces a positive level at the Q output thereof on line 119 at the next bit time. Flip-flop 118 remains set throughout the printing operation and the positive level on line 119 is transmitted to the INHIBIT input of keyboard decode 5 to inhibit decode 5 from outputting any further decode outputs during this operation. The positive level on line 119 is also transmitted to the INHIBIT input of keyboard 1 to inhibit the generation of further keyboard-generated codes during this operation.

The positive level on line 119 enables one of the three inputs of AND circuit 108. Because the printer is not busy at this time, the positive level appears on line 115 enables another input of AND circuit 108. When the decimal tab flag code is shifted into buffer A on the next memory revolution, decode 12 produces a positive level on line 133 enabling the third input of AND circuit 108 to produce a positive output to the set input of CONT. LINE D flip-flop 129.

One bit time later, when the decimal tab flag code is shifted from buffer A into register N, flip-flop 129 becomes set producing a positive level at the Q output thereof on line 130. The positive level on line 30 enables one of the two inputs of AND circuit 120. When the decimal tab flag code was shifted from buffer A into register N, the backspace code following the decimal tab flag code was shifted from the last memory storage location into buffer A. The decoding of this backspace code in buffer A produces a positive level on line 137 enabling AND circuit 120 to produce a positive level at the output thereof on line 121.

This positive level on line 12 is gated through OR circuit 122 to provide a positive level on line D. Memory organization at this point is as follows: tab code in buffer B, decimal tab flag code in register N, and the first of a series of backspace codes in buffer A. At the next bit time the tab code is shifted from buffer B into the first storage location of memory 10. Because a positive level was present on line D, the decimal tab flag code cannot be conveyed along path 28 to buffer B. Instead, the center flag code is shifted along cable 18 into register I1, while also remaining in register N, since no code is shifted into register N to write over the decimal tab flag code. The backspace code is shifted from buffer a along path 25 into buffer B. Line D is sequentially driven positive in a like manner for each of the succeeding backspace codes that are shifted into buffer A. After the last backspace code has been shifted out of buffer A along path 25 and into buffer B, the next code to be shifted into buffer A will be a character code. At this time, decode 12 provides a positive level on line 138 to one of the three inputs of AND circuit 125, since the character code is not a backspace code. Decode 12 provides a positive level on line 139 to a second input of AND circuit 125, since the character code in buffer A is not the operation flag code. The positive level on line 130 is applied to the third input of AND circuit 125 which enables the production of a positive level at the output thereof on line 126.

The positive level on line 126 is applied to line A and is gated through OR circuit 122 to be applied to line D. The application of a positive level to line A causes the character in buffer A to be gated onto data buss 15 during the same bit time. The positive level on line 126 is also gated through OR circuit 73 to enable AND circuit 74 to gate the character on data buss 15 to cable 75 and into printer 76 for printing. At the next bit time the character code in buffer A will be shifted along path 25 into buffer B because of the positive level applied to line D during the preceding bit time.

Figure 14:
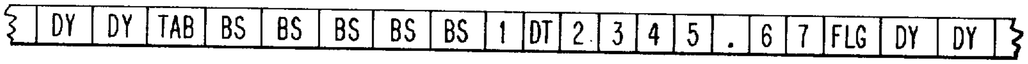

At the same time that the character code is gated from data buss 15 into printer 76, a positive level appears on printer busy line 114 which is gated through OR circuit 109 to reset flip-flop 129 at the next bit time thereafter. The resetting of flip-flop 129 results in a negative level on line 130 which inhibits AND circuit 125 from allowing further character codes to be gated onto the data buss and to the printer during this memory revolution. However, line D became negative at the beginning of the bit time in which the character code in buffer A was shifted along path 25 into buffer B. At that time path 28 became available for the decimal tab flag code stored in register N to be shifted into buffer B at the following bit time. The memory organization following this shift is shown in FIG. 14. It will, thus, be understood by those skilled in the art that the decimal tab flag code is used as a print position flag during this initial printout operation.

On the next memory revolution decode 12 provides a positive level on line 133 to one of the inputs of AND circuit 108 when the decimal tab flag code is shifted into buffer A. Line 119 into AND circuit 108 remains positive because of the sustained, set condition of flip-flop 118. Assuming that printer busy line 114 is now negative, a positive level on line 115 enables the third input of AND circuit 108 to provide a positive level to the SET input of flip-flop 129. At the next bit time thereafter, a positive level is present on line 130 providing a positive level to one of the three inputs of AND circuit 125. AND circuit 125 provides a positive level output on line 126 provided that the code now present in buffer A is neither a backspace code nor the operation flag code. The positive level on line 126 enables the printing of the character presently stored in buffer A in the same manner as described above. As soon as the character is sent to the printer, printer busy line 114 becomes positive which resets flip-flop 129 one bit time thereafter. At this next bit time the character in buffer A is shifted along path 25 into buffer B. At the next succeeding bit time path 28 is available to the succeeding codes, and the decimal tab flag code is again inserted into the data stream immediately following the character just printed.

Figure 15:
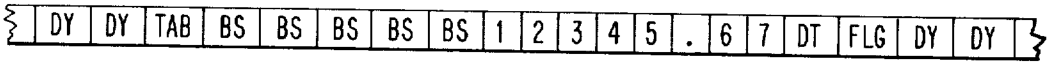

Assume now that the last character has been printed and that the decimal tab flag code has been dropped back into the data stream immediately following the last character. The decimal tab flag code is, therefore, positioned between the last character and the operation flag code by virtue of the printing operation of the system described above. Such a memory organization is depicted by FIG. 15 with the assumption that the number stored in memory 10 is 12345.67.

When the decimal tab flag code is shifted into buffer A on the next memory revolution, decode 12 produces a positive level on line 133, thereby enabling one of the input of AND circuit 108. Assuming that the printer is not busy a positive level is present on line 115 to enable another input of AND circuit 108. Because flip-flop 118 has remained set during this period a positive level is also present on line 119 enabling AND circuit 108 to produce a positive level at the output thereof to set flip-flop 129 at the next bit time. At this next bit time the decimal tab flag code is shifted from buffer A into register N and the operation flag code is shifted from the last storage location of memory 10 into buffer A. Decode 12, therefore, provides a positive level on line 132 to enable one of the inputs of AND circuit 127. A positive level is also provided on line 130 by virtue of the set condition of flip-flop 129, thereby enabling another of the three inputs of AND circuit 127. Assuming that the printer is not busy, a positive level on line 115 enables the third input of AND circuit 127 thereby providing a positive output on line 128. The positive level on line 128 is gated through OR circuit 79 to enable AND circuit 80 to gate the field-end code from keyboard buffer 3 onto data buss 15. The positive level on line 128 is also gated through OR circuit 45 to provide a positive level on line E. The positive level on line E will enable the field-end code to be shifted from the data buss into buffer B at the next bit time. The positive level on line 128 is also gated through OR circuit 73 to enable AND circuit 74 to gate the field-end code from data buss 15, along cable 75 and into printer 76 for execution by printer 76. The positive level on line 128 also resets DEC. TAB flip-flop 37 and PRINT DEC. TAB flip-flop 118 at the next bit time.

Figure 16:
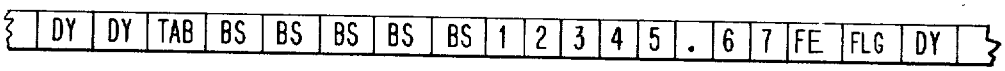

When the next bit time occurs, the last character of the character group stored in memory is shifted out of buffer B into the first storage location of memory 10. The field-end code on data buss 115 is shifted into buffer B and the decimal tab flag code is shifted from register N along cable 18 into register I1 because of the positive level on line E when the shift occurred. The operation flag code is shifted from buffer A into register N. At the next shift time the logical level on line E will be negative so that the operation flag code in register N will be conveyed along path 28 into buffer B and the field-end code in buffer B will be shifted into the first memory location of memory 10. FIG. 16 depicts the relevant portion of the data stream circulating through memory 10 after the replacement of the decimal tab flag code with the field-end code.

For subsequent print-out of this data code stream the operation flag code may be moved to a position peceding the tab code and may then be shifted around each control code for printer control and around each character code for character print-out. After the first printing, therefore, the operation flag code position defines the operating point for output of control and character codes to the printer just as the decimal tab flag code was used above to define the operating point of character codes output to the printer after the printer had previously been backspaced during the entry of the characer codes into the memory. It will then be appreciated by those skilled in the art that the data and control codes stored in memory 10 (excluding the operation flag code) may be recorded out of memory 10 onto a bulk media such as a magnetic tape or a magnetic card and may then be printed by another type of text editing system not including the above disclosed decimal tab mode of operation.

Operation of the invention in a decimal tab mode would typically involve setting a tab stop at the desired decimal point location. Thereafter, upon depression of the decimal tab key on the keyboard, the system enters the decimal tab mode of operation and the print carrier or carriage performs a tabulation to the selected tab stop (assuming that no other tab stops are set). The operator may then enter the characters (typically a number including a decimal point) from the keyboard. As the digits to the left of the decimal point are entered, the digits are entered into the memory while the printer preforms a no-print backspace cycle for each character. Beginning with the depression of the decimal point key no further backspaces occur, although any number of characters to the right of the decimal point may be entered. When a field-end code (such as a carrier return) is struck at the keyboard, the characters are printed and the field-end operation is executed (such as the carrier return). At this point the system is no longer in the decimal tab mode of operation. For the next number of the column to be entered, the operator need only strike the decimal tab key to return the system to this mode of operation. Upon the depression of the decimal tab key the print carrier again tabulates to the previously selected decimal point position and thee next number may be entered as described above. When this next number is entered into the memory it is also preceded by the tab code so that the carrier will again escape to this position upon subsequent printings of the memory contents.

If an error is discovered by the operator during entry of a character group, a depression of the error-correct key will cause a deletion of the previously entered digits of that number and will cause the carrier to be repositioned to the tab stop position. The system remains in the decimal tab mode of operation and the operator need only enter the correct group of digits.

If it is desired to perform a flush right operation rather than a decimal tab operation the operator need only set the tabulation stop one space to the right of the desired right-most character or right margin location. Textual characters may be entered in the same manner as a number with the depression of a field-end key at the end of character entry. This causes a print-out of characters to occur with the last character previously entered being printed at the desired right margin location.

It will be understood that the "period" character cannot be used in a flush right application, as it would inhibit further backspacing of the carrier and the entry of further backspace codes into the memory for characters entered subsequent to the period. This assumes, of course, that the period key is the same key as the decimal point key, although it will be understood by those skilled in the art that separate period and decimal point keys, and codes therefor, could be provided to eliminate this problem.

It will also be understood that commas, conventionally used to separate groups of three digits in a number, may also be entered into this system in the conventional manner, as they are treated herein as character codes. However, in some languages the significance of the comma and period or decimal point are reversed from the way in which these symbols are used in this country. For text processing applications in such languages, it will be understood by those skilled in the art that a second decimal tab key could be provided on the keyboard enabling the system to respond to a comma in the manner in which it responds to the decimal point as explained above.

While the invention has been particularly shown and described with reference to a preferred embodiment thereof, it will be understood by those skilled in the art that the foregoing and other changes in form and details may be made therein without departing from the spirit and scope of the invention. For example, it will be understood by those skilled in the art that input means other than a keyboard may be utilized for initial code generation including, for example, a transmission line in a communications system. It will also be understood that memory devices other than dynamic shift register memories, such as a magnetic bubble memory, may be utilized for the data code storage device.

What is claimed:

1. A system for arranging the sequence of textual codes upon input of said codes into a recirculating memory having an operation flag code defining an operating point therein said system being operative to print said codes so arranged, comprising:

a keyboard for generating textual character codes, a decimal tab control code and a field-end code;

a decimal tab flag code generator for generating a decimal tab flag code;

a decoder connected to said memory for generating an OP FLAG signal in response to the detection, at a point in said memory, of said operation flag code and for generating a DEC TAB FLAG signal in response to the detection of said decimal tab flag code at said point in said memory;

decimal tab flag code input gating means connected to said decimal tab flag code generator, said memory, said keyboard, and said decoder and responsive to the generation of said OP FLAG signal and the keyboard generation of said decimal tab control code for inserting said decimal tab flag code into said memory at a storage location ahead of said operation flag;

a backspace code generator for generating backspace codes;

backspace code input gating means connected to said keyboard, said backspace code generator, said memory, and said decoder and responsive to the keyboard generation of one of said textual character codes and said DEC TAB FLAG signal for inserting one of said backspace codes into said memory in a memory storage location next succeeding the memory storage location of said decimal tab flag code;

textual character code input gating means connected to said keyboard, said memory, and said decoder and responsive to the generation of said one of said textual codes and said OP FLAG signal for inserting said one of said textual codes into said memory in a memory storage location next preceding the storage location of said operation flag code;

said backspace code input gating means and said textual character code input gating means cooperating with said keyboard, said backspace code generator and said decoder to provide for the storage isn said memory of said decimal tab flag code followed by a contiguous stream of backspace codes, followed by a contiguous stream of textual character codes, followed by said operation flag code;

a decimal point latching means connected to said keyboard and said backspace code input gating means for inhibiting the input of backspace codes into said memory after the keyboard generation of a decimal point textual character code;

a printer and printer gating means connecting said printer to said memory, said printer gating means being connected to said backspace code input gating means for enabling said printer to backspace once as each of said backspace codes is inserted into said memory; and a print latching means connected between said keyboard and said printer gating means, said print latching means responding to the keyboard generation of said field-end code for enabling said printer gating means to print said textual character codes inserted into said memory.

2. The system of claim 1 further comprising a delete code generator for generating delete codes, said keyboard including means for generating an error-correct code, an error-correct latching means connected to said keyboard for maintaining a first condition in response to the keyboard generation of said error-correct code, and delete code input gating means connected between said delete code generator and said memory, said decoder including means for decoding said backspace code and said textual character code, said delete code input gating means being enabled by said decoder and said first condition of said error-correct latching means for replacing and said backspace codes said textual character codes following said backspace codes, stored in said memory, with delete codes upon decoding said backspace codes and said textual character codes, until said operation flag code is decoded by said decoder.

3. The system of claim 2 further comprising a printer space code generator for generating printer space codes, said space code generator being connected to said printer gating means, said error correct latching means being connected to said printer space code generator and said printer gating means for causing said printer to space forward one space for each of said backspace codes in said memory replaced by said delete codes, during said first condition of said error-correct latching means.

* * * * *